United States Patent
Lin

(10) Patent No.: US 7,587,794 B2
(45) Date of Patent: Sep. 15, 2009

(54) SAFETY RETAINER FOR USE IN CURTAIN CONTROLLING ROPES

(75) Inventor: Shih-Ming Lin, Chiayi (TW)

(73) Assignee: Genes Industry, Inc., Placentia, CA (US)

( * ) Notice: Subject to any disclaimer, the term of this patent is extended or adjusted under 35 U.S.C. 154(b) by 391 days.

(21) Appl. No.: 11/675,771

(22) Filed: Feb. 16, 2007

(65) Prior Publication Data
US 2008/0196213 A1    Aug. 21, 2008

(51) Int. Cl.
*E06B 9/30* (2006.01)
(52) U.S. Cl. .............................. 24/115 F; 160/178.1 R
(58) Field of Classification Search .................. None
See application file for complete search history.

(56) References Cited

U.S. PATENT DOCUMENTS

| | | | | |
|---|---|---|---|---|
| 5,592,983 A * | 1/1997 | Sartini et al. | ........... | 160/178.1 R |
| 5,715,884 A * | 2/1998 | Cotten | ....................... | 24/115 A |
| 5,823,242 A * | 10/1998 | Huang | .................. | 160/178.1 R |
| 6,263,946 B1 * | 7/2001 | Cotten | .................. | 160/178.1 R |
| 6,910,517 B1 * | 6/2005 | Randall | ................ | 160/178.1 R |
| 6,948,546 B2 * | 9/2005 | Nien | ..................... | 160/178.1 R |
| 7,299,851 B2 * | 11/2007 | Dekker | ................. | 160/178.1 R |
| 7,331,371 B1 * | 2/2008 | Kovach et al. | ........ | 160/178.1 R |
| 7,383,871 B2 * | 6/2008 | Osinga | ................. | 160/178.1 R |
| 2008/0000054 A1 * | 1/2008 | Huang | ..................... | 24/115 F |

* cited by examiner

*Primary Examiner*—Jack W. Lavinder
(74) *Attorney, Agent, or Firm*—Alan Kamrath; Kamrath & Associates PA

(57) ABSTRACT

A safety retainer for use in curtain controlling ropes comprises first and second housings which engage with each other, wherein the first and second housings include four holes formed on the tops thereof, and two of the holes are formed by combining two semicircle-shaped holes together, between the first and second housings are respectively disposed protrusions and recesses corresponding to each other, on the combined bottom surface of the first and second housings is arranged a bore, such that the two or more controlling ropes are individually inserted into the holes and extended out of the bore for being limited, and a groove is annularly formed on the combined side periphery of the first and second housings for receiving a loop, thereby allowing the controlling ropes to be retained in the groove by the loop, and causing the first and second housings disengagement from each other because an external weight concentrate onto the safety retainer.

5 Claims, 8 Drawing Sheets

SAFETY RETAINER FOR USE IN CURTAIN CONTROLLING ROPES

BACKGROUND OF THE INVENTION

1. Field of the Invention

The present invention relates to a retainer, and more particularly to a safety retainer for use in curtain controlling ropes that can prevent an accident happening to child due to the controlling ropes wrap around his neck.

2. Description of the Prior Arts

Generally, curtain is applied to shade the sun. In order to enhance the operational convenience for curtain, a plurality of controlling ropes are attached to the curtain so than the user can manually control the sun shade area of the curtain by pulling the controlling ropes, hence the controlling ropes are indispensable compartments for the curtain.

Although a retainer is always secured onto the plurality of controlling ropes for retaining the controlling ropes, and for preventing the controlling ropes from knotting, the bottom sections of the controlling ropes respectively form rounded ropes, hence if child's neck is accidentally wrapped by one of the round ropes, asphyxiation probably occurs.

The present invention has arisen to mitigate and/or obviate the afore-described disadvantages.

SUMMARY OF THE INVENTION

The primary objective of the present invention is to provide a safety retainer for use in curtain controlling ropes, which can allow controlling ropes to be retained in a groove by a loop thereof, and if child's neck is wrapped by the controlling ropes, his weight is forced onto the safety retainer by the controlling ropes which are retained in the safety retainer, hence two separated forces cause first and second housings to disengage from each other, and the loop disengages from the groove, then the controlling ropes remove from a bore separately, thus releasing the wrapped controlling ropes from the child's neck.

The safety retainer for use in curtain controlling ropes includes a first housing and a second housing which engage with each other for retaining two or more controlling ropes, wherein the first and second housings include four holes formed on the tops thereof, and two of the holes are formed by combining two semicircle-shaped holes as a whole, between the first and second housings are respectively disposed protrusions and recesses corresponding to each other, on the combined bottom surface of the first and second housings is arranged a bore, such that the two or more controlling ropes are individually inserted into the holes and further extended out of the bore for being limited therein, and a groove is annularly formed on the combined side periphery of the first and second housings for receiving a loop, thereby allowing the controlling ropes to be retained in the groove of the safety retainer by way of the loop, and if a sudden weight is forced onto the safety retainer by the controlling ropes, two separated forces form to cause the disengagement of the first and second housings from each other.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
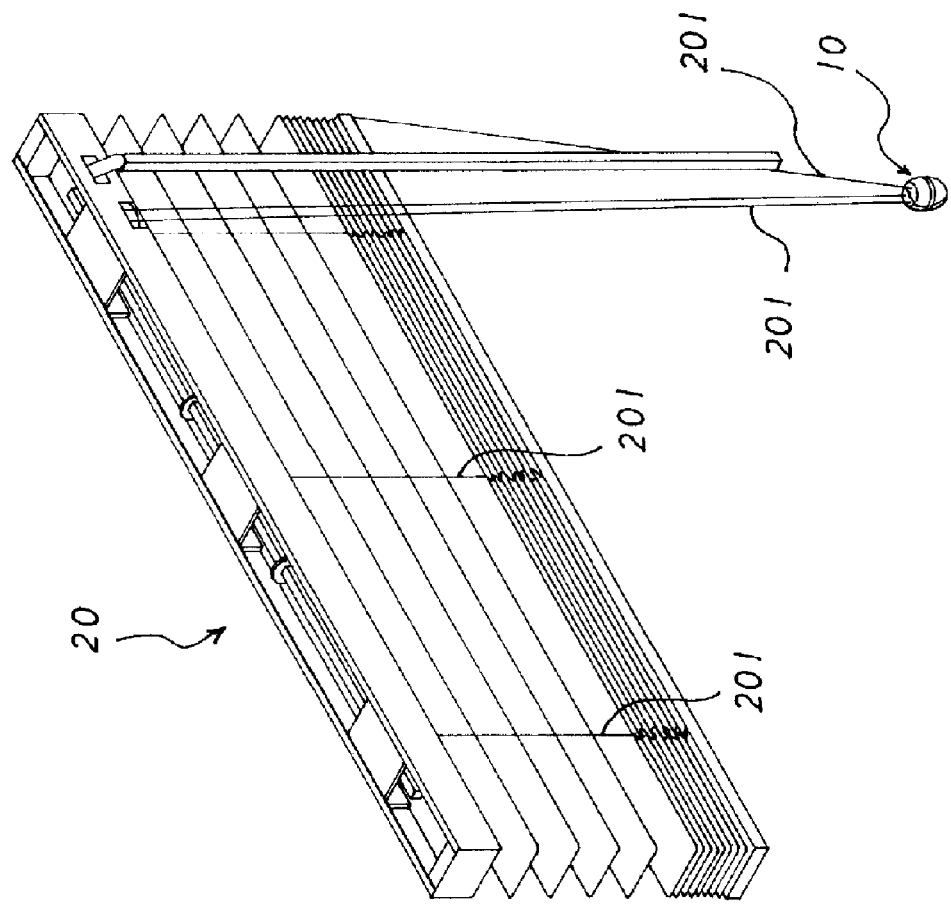
FIG. 1 illustrates a safety retainer of the present invention attached to a curtain.
Figure 2:
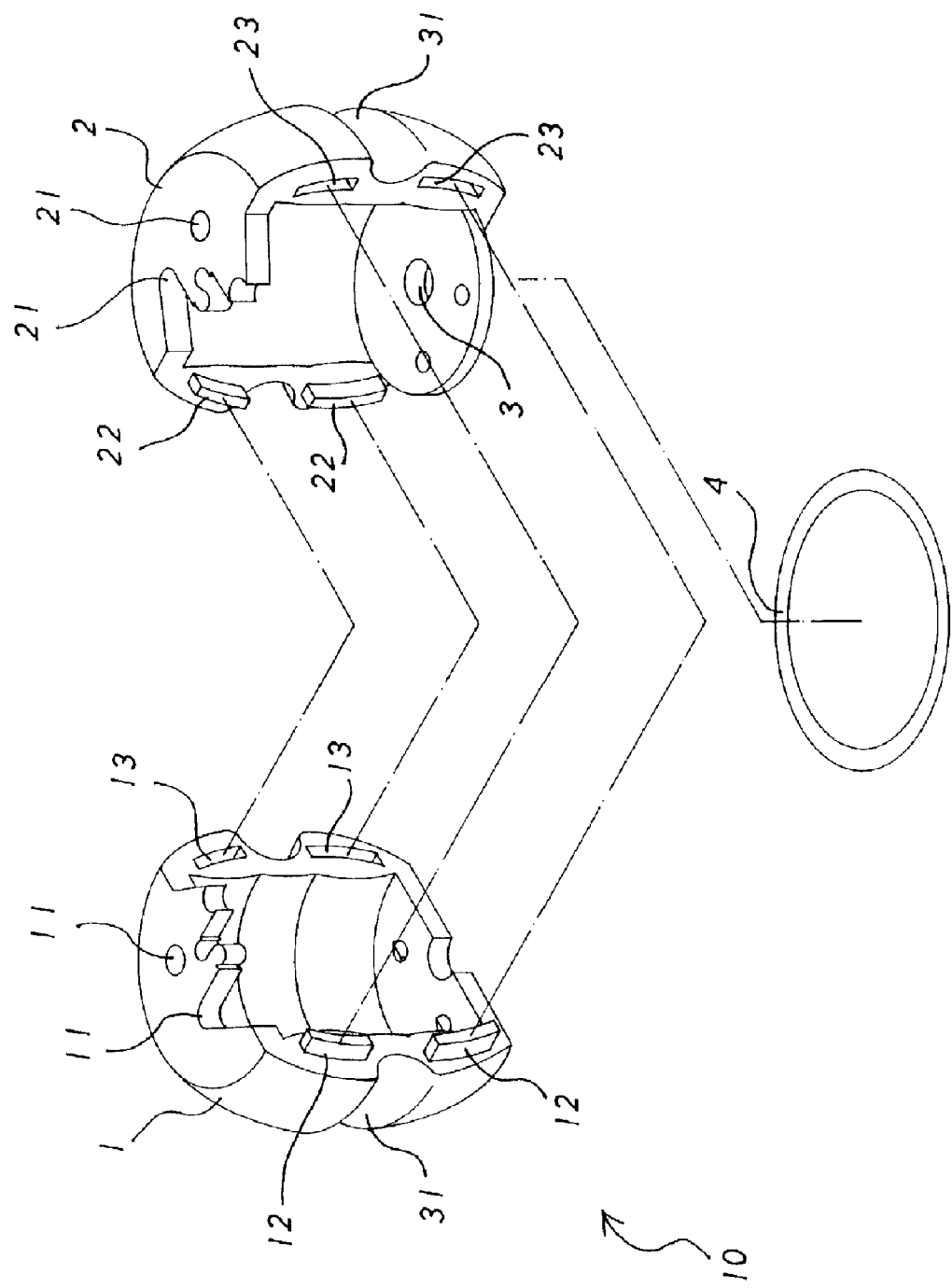
FIG. 2 is an exploded view of the safety retainer for use in curtain controlling ropes in accordance with the present invention.
Figure 3:
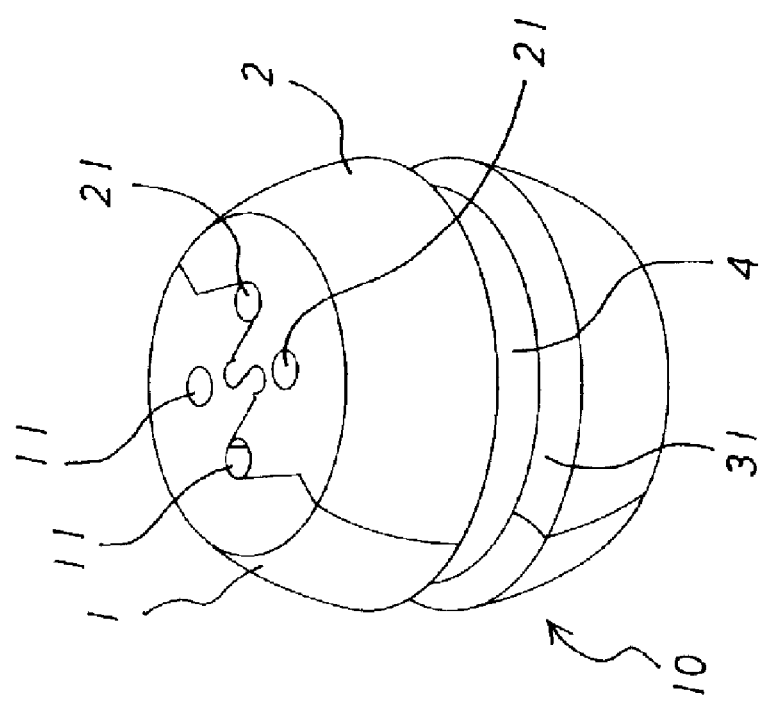
FIG. 3 is a perspective view of the safety retainer for use in curtain controlling ropes in accordance with the present invention.
Figure 4:
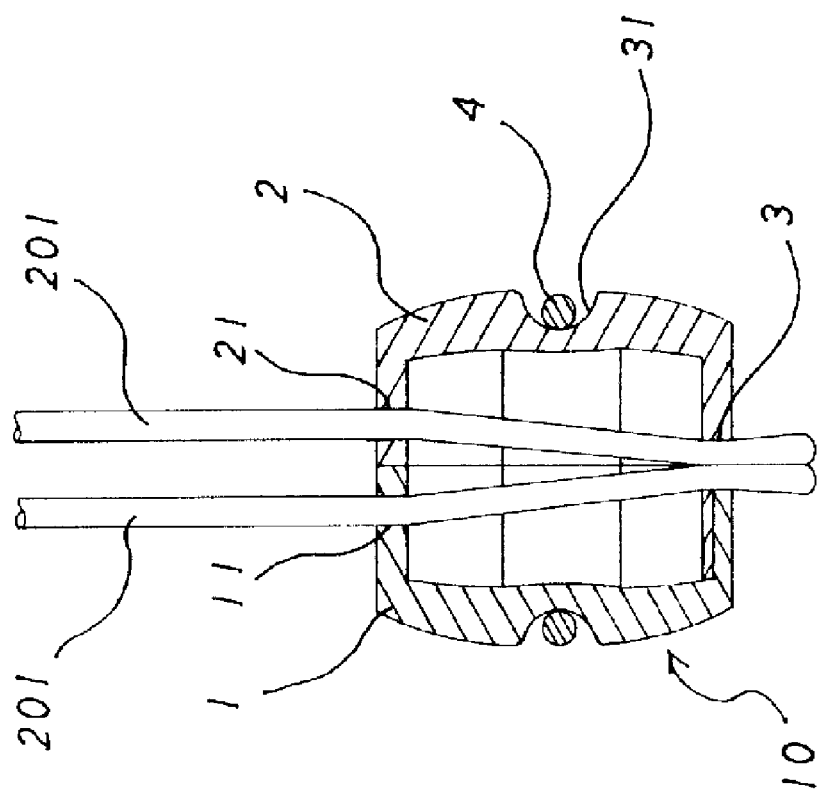
FIG. 4 is an assembly cross sectional view illustrating the controlling ropes retained in the safety retainer of the present invention.

A safety retainer 10 for use in curtain controlling ropes in accordance with the present invention comprises a first housing 1 and a second housing 2 which engage with each other for retaining two or more controlling ropes 201, as shown in FIG. 1, wherein the first and second housings 1 and 2 include four holes 11 and 21 formed on the tops thereof, as shown in FIG. 2, and two of the holes 11 and 21 are formed by combining two semicircle-shaped holes as a whole, between the first and second housings 1 and 2 are respectively disposed protrusions 12, 22 and recesses 13, 23 corresponding to each other, on the combined bottom surface of the first and second housings 1 and 2 is arranged a bore 3, and a groove 31 is annularly formed on the combined side periphery of the first and second housings 1 and 2 for receiving a loop 4 as illustrated in FIG. 3, such that the two or more controlling ropes 201 are individually inserted into the holes 11 and 21 of the first and second housings 1 and 2, for example, two controlling ropes 201 are inserted into the holes 11 and 21 respectively, yet while three controlling ropes 201 inserted, the third controlling rope 201 is inserted into either of the combined holes 11 and 21 so that as any two controlling ropes 201 are pulled apart from each other, the safety retainer 10 can be disassembled into the first and second housings 1 and 2. Besides, the controlling ropes 201 are further extended out of the bore 3 for being limited therein, thereby allowing to be retained in the groove 31 of the safety retainer 10 by way of a loop 4.

Figure 5:
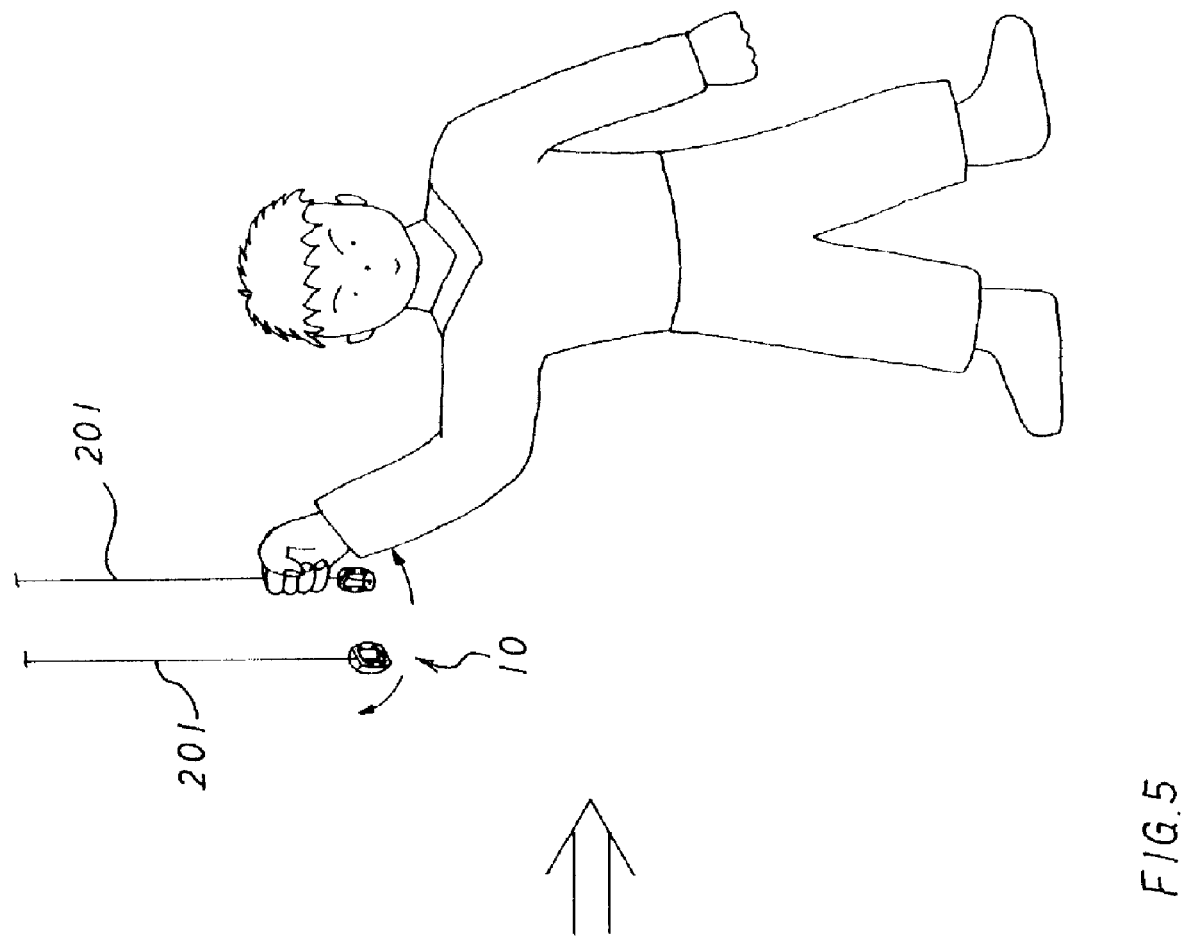
FIG. 5 illustrates first and second housings disengaging from each other because a sudden weight is forced onto the safety retainer by the controlling ropes.
Figure 5:
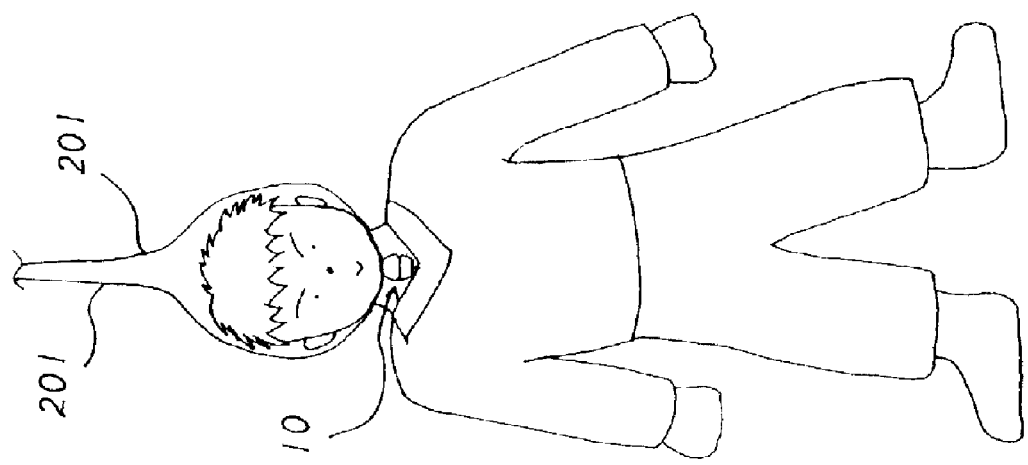

While in operation, the first and second housings 1 and 2 of the safety retainer 10 are not easily disengaged, thereby securely combing them together and retaining the plurality of controlling ropes 201 by means of the loop 4. However, if child's neck is wrapped by the controlling ropes 201, his weight is forced onto the safety retainer 10 by the controlling ropes 201 which are retained in the safety retainer 10, hence two separated forces cause the disengagement of the first and second housings 1 and 2 from each other as illustrated in FIG. 5, and the loop 4 disengages from the groove 31, then the controlling ropes 201 remove from the bore 3 separately, thus releasing the wrapped controlling ropes 201 from child's neck.

Figure 6:
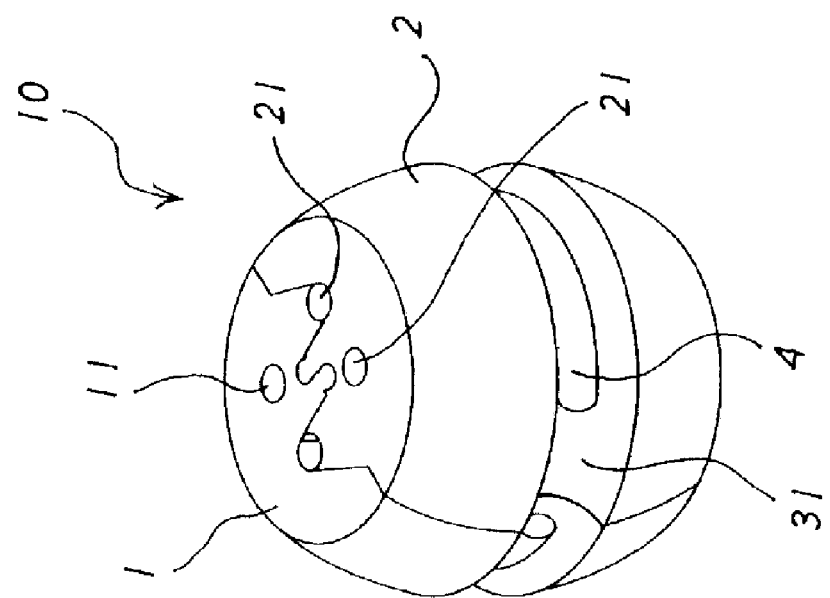
FIG. 6 is a perspective view of the safety retainer for use in curtain controlling ropes in accordance with another embodiment of the present invention.
Figure 7:
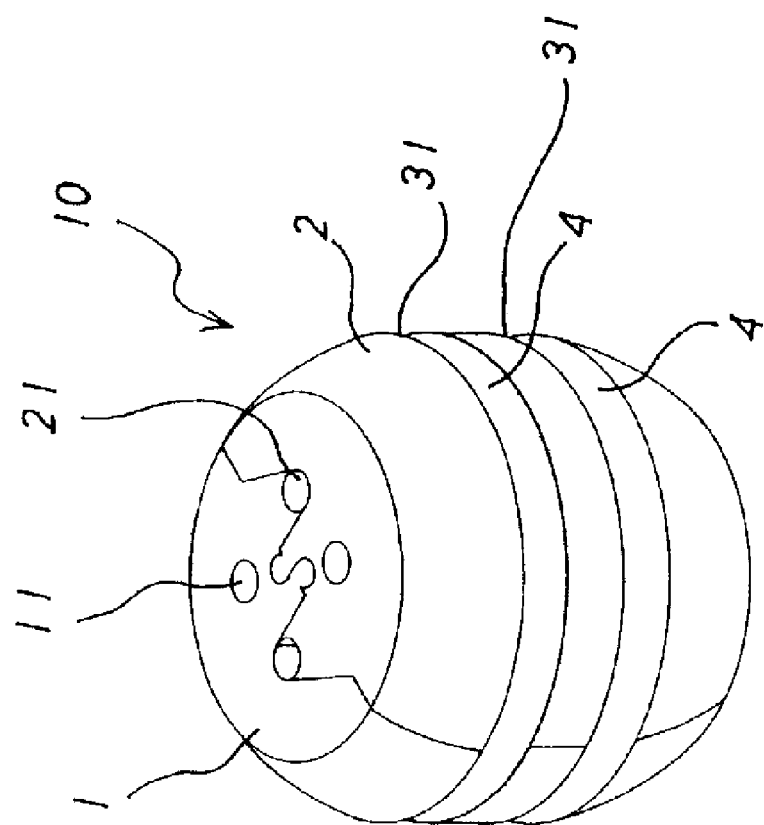
FIG. 7 is also a perspective view of the safety retainer for use in curtain controlling ropes in accordance with another embodiment of the present invention.

The loop 4 may be a resilient loop or a C-shaped fastener as shown in FIG. 6, and the recess 31 of the safety retainer 10 may also be arranged in a multi-recesses manner for receiving a plurality of corresponding loops 4 respectively, thus enhancing the engagement of the safety retainer 10 as illustrated in FIG. 7.

Figure 8:
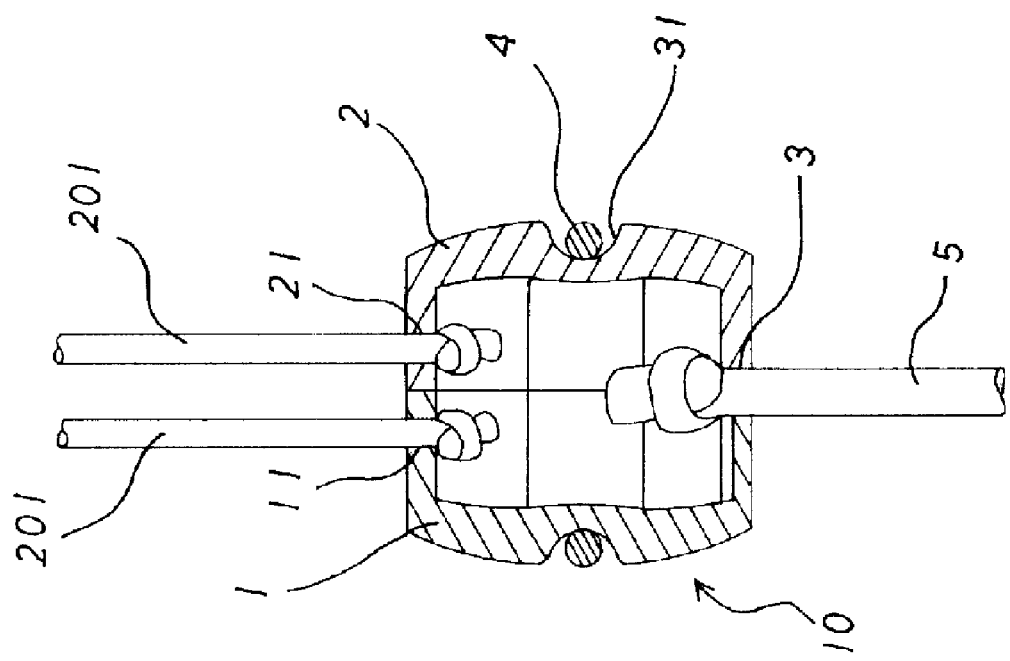
FIG. 8 is an assembly cross sectional view of the safety retainer for use in curtain controlling ropes in accordance with another embodiment of the present invention.

After inserting into the holes 11 and 21, the controlling ropes 201 may be individually knotted thereon for retaining as shown in FIG. 8, and a main rope 5 with a knot thereon extends out of the bore 3 so that the user can operate the controlling ropes 201 by pulling the main rope 5.

The invention is not limited to the above embodiment but various modifications thereof may be made. It will be understood by those skilled in the art that various changes in form and detail may made without departing from the scope and spirit of the present invention.

What is claimed is:

1. A safety retainer for use in curtain controlling ropes comprising:
   a first housing and a second housing which engage with each other for retaining two or more controlling ropes, wherein said first and second housings include four holes formed on the tops thereof, and two of said holes are formed by combining two semicircle-shaped holes as a whole, between said first and second housings are respectively disposed protrusions and recesses corresponding to each other, on the combined bottom surface of said first and second housings is arranged a bore, such that said two or more controlling ropes are individually inserted into said holes and further extended out of said bore for being limited therein, and a groove is annularly formed on the combined side periphery of said first and second housings for receiving a loop, thereby allowing said controlling ropes to be retained in said groove of said safety retainer by way of said loop, and if a sudden weight is forced onto said safety retainer by said controlling ropes, two separated forces form to cause said first and second housings to disengage from each other.

2. The safety retainer for use in curtain controlling ropes as claimed in claim 1, wherein said loop may be a resilient loop.

3. The safety retainer for use in curtain controlling ropes as claimed in claim 1, wherein said loop may be a C-shaped fastener.

4. The safety retainer for use in curtain controlling ropes as claimed in claim 1, wherein said recess of said safety retainer may also be arranged in a multi-recesses manner for receiving a plurality of corresponding loops respectively, thus enhancing the engagement of said safety retainer.

5. The safety retainer for use in curtain controlling ropes as claimed in claim 1, wherein after inserting into said holes of said first and second housings, said controlling ropes may be individually knotted thereon for retaining, and a main rope with a knot thereon extends out of said bore so that the user can operate said controlling ropes by pulling said main rope.

* * * * *